(No Model.)

W. D. FORBES.
MACHINE FOR MILLING AND TAPPING METAL.

No. 512,542. Patented Jan. 9, 1894.

(No Model.) 2 Sheets—Sheet 2.

W. D. FORBES.
MACHINE FOR MILLING AND TAPPING METAL.

No. 512,542. Patented Jan. 9, 1894.

WITNESSES:
George Baumann

INVENTOR
William D. Forbes
BY Howson & Howson
his ATTORNEYS.

UNITED STATES PATENT OFFICE.

WILLIAM D. FORBES, OF HOBOKEN, ASSIGNOR TO THE A. A. GRIFFING IRON COMPANY, OF JERSEY CITY, NEW JERSEY.

MACHINE FOR MILLING AND TAPPING METAL.

SPECIFICATION forming part of Letters Patent No. 512,542, dated January 9, 1894.

Application filed October 21, 1893. Serial No. 488,825. (No model.)

*To all whom it may concern:*

Be it known that I, WILLIAM D. FORBES, a citizen of the United States, and a resident of Hoboken, Hudson county, New Jersey, have invented Improvements in Machines for Milling and Tapping Metal, of which the following is a specification.

My invention relates to that class of metal working machines in which two successive operations, such as milling and boring or milling and tapping, for instance, are performed with one setting of the piece to be operated on.

The object of my invention is to construct a simple mechanism for carrying out such successive operations automatically.

Figure 1:
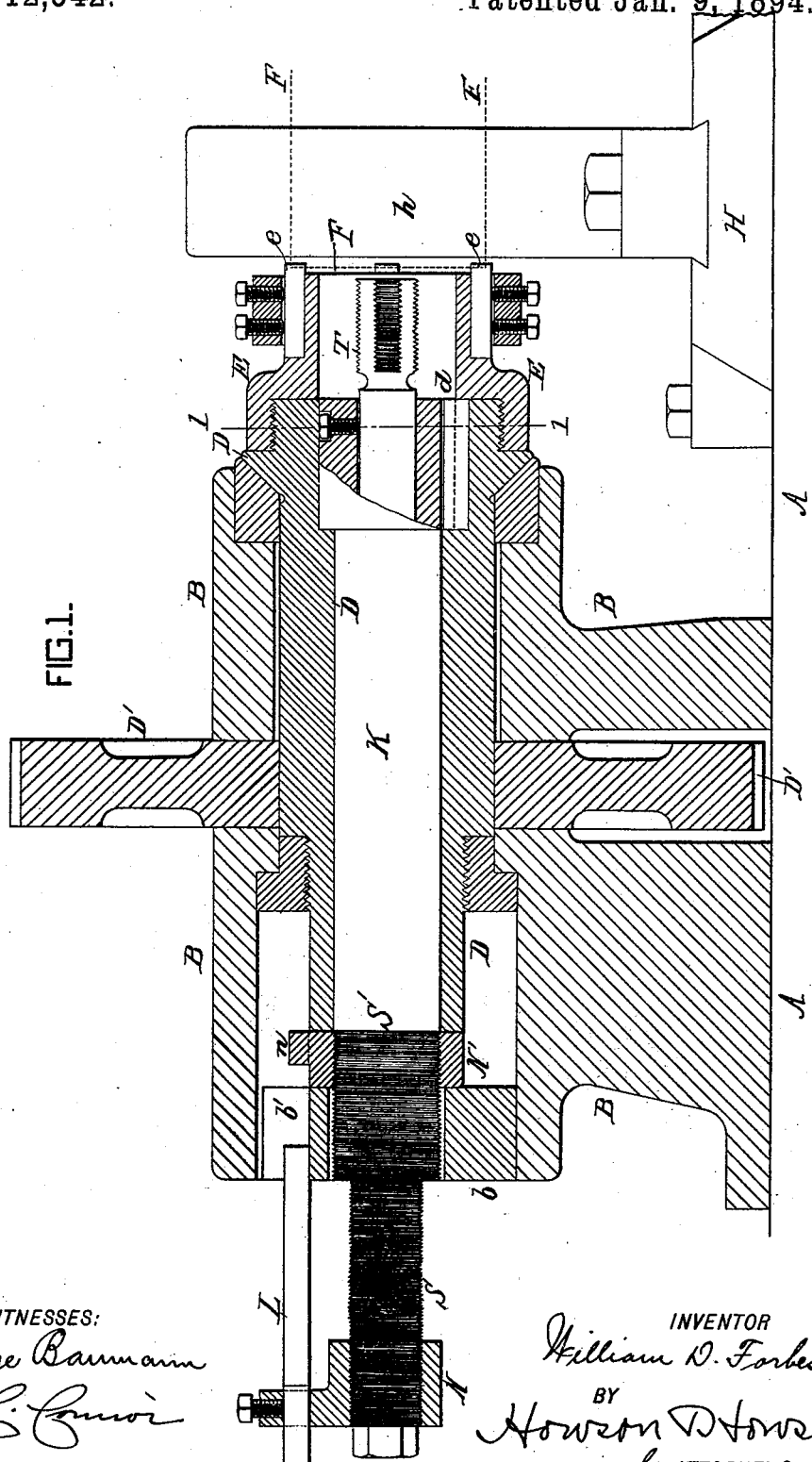
Figure 2:
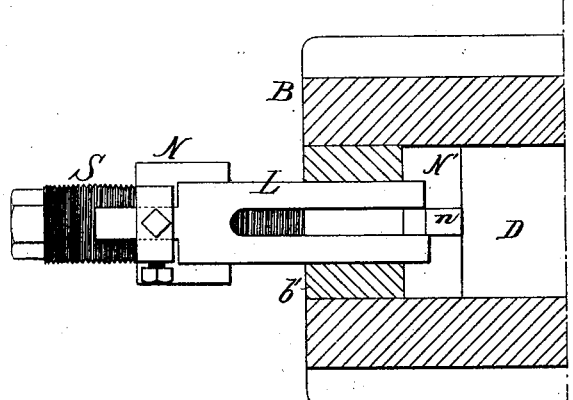
Figure 3:
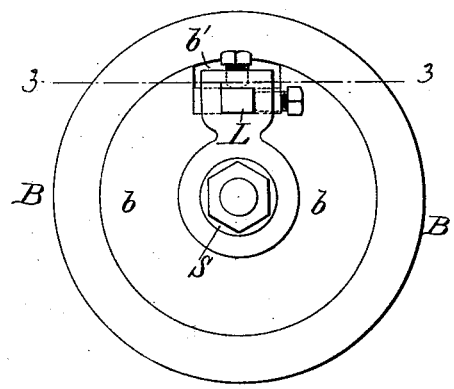
Figure 4:
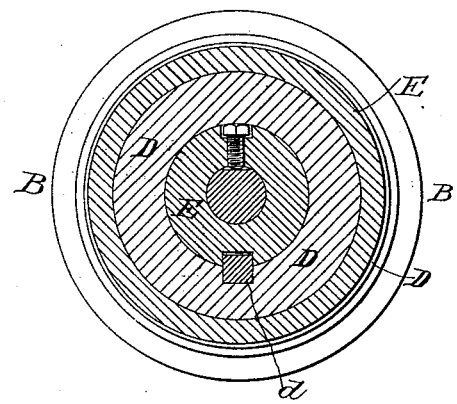

In the accompanying drawings, Figure 1 is a longitudinal section of a mechanism embodying my invention. Fig. 2 is a sectional plan on the line 3—3, Fig. 3. Fig. 3 is a rear view of the head; and Fig. 4 is a sectional view upon the line 1—1, Fig. 1.

I provide upon a suitable frame or bed plate A, which in this case is shown as horizontal, a head or bearing B, of any suitable or convenient shape. In bearings in this head is mounted a tubular spindle D, to the outer end of which is secured the tool which is to do one of the operations upon the piece of metal to be worked. In this case I have shown the spindle as carrying a rotary milling tool E, provided with any suitable number of cutters $e$. The work to be operated upon is indicated by dotted lines at F and is shown as carried by a holder $h$ mounted upon a platen H adapted to travel in ways upon the bed plate A at right angles to the axis of the tool spindle D. This tool spindle has mounted upon or secured to it a pulley or gear wheel D', by which rotary motion may be imparted to the spindle by any convenient mechanism in either direction and at the speed desired. Within this hollow spindle is a central spindle K which must rotate with, but can move longitudinally of, the tubular spindle. For this purpose, a key $d$ carried by the tubular spindle is shown in this instance as working within a key-way in the central spindle. Upon the rear of this central spindle is formed or secured a feed screw S to which is adapted a nut N carrying a locking bar L. This locking bar is preferably forked, as shown in Fig. 2, and fits snugly, but so as to slide freely within a slot $b'$ in a part $b$ of the fixed head or frame B. As under all ordinary conditions this locking bar L is within this slot the nut N is locked to the frame and so cannot turn with the central spindle, but must travel thereon in one direction or the other according to the direction of rotation of the spindles. Upon this central spindle K there is a second and inner feed screw S' preferably of coarser pitch. To this screw is adapted a feed nut N', between the inner end of the tubular spindle D and the part $b$ of the head or frame. Upon this nut N' is a lug $n$ of a size to fit and slide within the fork of the locking bar L (Fig. 2). So long as this lug is not in contact with the locking bar, however, the nut N' simply turns with the spindle K, but when the bar L has advanced into engagement with the lug on the nut N', the latter is then locked to the frame and by the action of the feed screw S' causes the central spindle to advance upon the work. The outer end of this spindle carries the tapping, boring or other tool T. In this instance I have shown it as carrying a tapping tool.

From the foregoing description, the operation will be readily understood. Assuming that the first operation is that of milling, and the parts being in positions shown in Fig. 1, with the work mounted in the holder, the platen carrying the work in the proper position, is caused by any suitable feed mechanism to travel across the bed of the machine, and at the same time rotary motion is imparted to the tubular spindle D carrying the tool to mill the metal operated on. As the central spindle K rotates with the tubular spindle, the locking bar L is caused to advance within the frame toward the nut N', which it reaches by the time the milling operation has been completed and the work has reached or been placed in a position ready for the tapping. The lug $n$ upon the nut N' then engaging with the locking bar, as indicated in Fig. 2, the said nut is locked to the frame and causes the central spindle K to advance the tapping tool T to and into the work. When the tapping is finished, the rotary motion of the spindles is reversed automatically or by hand, and the tapping tool is withdrawn again from the work, the locking bar L becomes disengaged from the feed nut N' and the work is removed from the holder ready for a repetition of the operations upon another piece of work.

I claim as my invention—

1. The combination of a frame or head, a rotary tubular tool-carrying spindle and a central tool-carrying spindle adapted to turn with but move longitudinally independently of the said tubular spindle with a feed screw and nut for advancing the central spindle and mechanism for automatically locking said feed nut to the frame at a desired point, substantially as described.

2. The combination of a head or frame, a rotary tubular tool-carrying spindle and a central tool-carrying spindle adapted to turn with but move longitudinally independently of the tubular spindle, the said central spindle having two feed screws with a nut adapted to travel on one feed screw and carrying a locking bar to engage with the frame, and a nut on the other feed screw to engage with the locking bar as it slides in the frame, all substantially as and for the purpose described.

3. The combination of a head or frame, a rotary tubular spindle carrying a milling tool, a central spindle carrying a tapping tool and having a key and way connection with the tubular spindle, with a feed screw and nut for advancing the central spindle and mechanism for automatically locking said feed nut to the frame at a desired point, substantially as described.

4. The combination of a head or frame, a tubular tool-carrying spindle, and a central tool-carrying spindle adapted to turn with but move longitudinally independently of the tubular spindle, the said central spindle having two feed screws, with a nut adapted to travel on one feed screw and carrying a forked locking bar to engage with the frame, and a nut on the other feed screw having a lug to enter the fork of the locking bar, as it slides in the frame, all substantially as described.

In testimony whereof I have signed my name to this specification in the presence of two subscribing witnesses.

WILLIAM D. FORBES.

Witnesses:
S. C. CONNOR,
HUBERT HOWSON.